US008831507B2

(12) United States Patent
Murray et al.

(10) Patent No.: US 8,831,507 B2
(45) Date of Patent: Sep. 9, 2014

(54) METHOD AND SYSTEM FOR DETERMINING A POSITION FIX INDOORS

(75) Inventors: Dave Murray, Mission Viejo, CA (US); Charles Abraham, Los Gatos, CA (US); Mark Buer, Gilbert, AZ (US); David Garrett, Tustin, CA (US); Jeyhan Karaoguz, Irvine, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 287 days.

(21) Appl. No.: 12/732,986

(22) Filed: Mar. 26, 2010

(65) Prior Publication Data

US 2011/0200023 A1    Aug. 18, 2011

Related U.S. Application Data

(60) Provisional application No. 61/305,174, filed on Feb. 17, 2010.

(51) Int. Cl.
*H04B 5/00* (2006.01)

(52) U.S. Cl.
USPC ....... 455/41.1; 455/41.2; 455/456.3; 370/338

(58) Field of Classification Search
USPC .............. 455/552.1, 456.1, 561, 456.6, 457, 455/41.3, 575.1, 562.1, 16, 456.3, 41.1, 455/456.5; 437/277; 342/357.51, 356, 352, 342/357.57; 40/791; 370/338
See application file for complete search history.

(56) References Cited

U.S. PATENT DOCUMENTS

| 6,684,055 | B1 * | 1/2004 | Blackaby et al. ............ 455/11.1 |
| 6,920,319 | B2 * | 7/2005 | Knutsson et al. .......... 455/422.1 |
| 7,489,240 | B2 * | 2/2009 | Soliman .................... 340/572.1 |
| 8,116,291 | B2 | 2/2012 | Annamalai et al. |

(Continued)

FOREIGN PATENT DOCUMENTS

| CN | 101208728 A | 6/2008 |
| TW | 200301658 A | 7/2003 |
| WO | WO 2006/119412 A2 | 11/2006 |
| WO | WO 2007/018790 A1 | 2/2007 |

OTHER PUBLICATIONS

Radio-frequency identification, Jun. 21, 2012, Wikipedia, see p. 1, 3.*
Coaxial cable, Jun. 21, 2012, Wikipedia, see p. 1-2.*

(Continued)

Primary Examiner — Mahendra Patel
(74) Attorney, Agent, or Firm — Sterne, Kessler, Goldstein & Fox P.L.L.C.

(57) ABSTRACT

Whenever a mobile device in a building is within proximity of a RF communication device, the mobile device may be operable to receive location information transmitted, for example by broadcasting it, from a RF communication device. The transmitted location information comprises altitude information of the RF communication device. At least an altitude of the mobile device may be determined based on the received altitude information of the RF communication device. The RF communication device may be located in an elevator car and/or on a particular floor in the building. Whenever the RF communication device is located in the elevator car, the altitude information of the RF communication device may be received by the RF communication device from an elevator controller. In instances when the RF communication device also transmits its latitude/longitude (LAT/LON), the mobile device may be operable to determine a 3-dimentional (3D) location of the mobile device.

21 Claims, 6 Drawing Sheets

(56) References Cited

U.S. PATENT DOCUMENTS

| | | | |
|---|---|---|---|
| 2003/0117320 A1* | 6/2003 | Kim et al. | 342/457 |
| 2003/0164822 A1* | 9/2003 | Okada | 345/204 |
| 2003/0225893 A1* | 12/2003 | Roese et al. | 709/227 |
| 2005/0246092 A1 | 11/2005 | Moscatiello | |
| 2007/0106518 A1 | 5/2007 | Wildman et al. | |
| 2007/0239350 A1* | 10/2007 | Zumsteg et al. | 701/207 |
| 2008/0048914 A1* | 2/2008 | Smith et al. | 342/464 |
| 2009/0043504 A1* | 2/2009 | Bandyopadhyay et al. | 701/213 |
| 2009/0098880 A1 | 4/2009 | Lindquist | |
| 2009/0258656 A1* | 10/2009 | Wang et al. | 455/456.1 |
| 2009/0258660 A1* | 10/2009 | Bush et al. | 455/456.5 |
| 2009/0325606 A1* | 12/2009 | Farris | 455/456.3 |
| 2010/0260064 A1* | 10/2010 | Garg et al. | 370/254 |
| 2011/0237185 A1 | 9/2011 | Murray et al. | |

OTHER PUBLICATIONS

European Search Report for EP Application No. EP 11 00 1233, Munich, Germany, search completed on Dec. 28, 2011 (3 pages).

Office Action for related Taiwanese Patent Application No. 100105226, mailed Dec. 5, 2013; 5 pages.

* cited by examiner

METHOD AND SYSTEM FOR DETERMINING A POSITION FIX INDOORS

CROSS-REFERENCE TO RELATED APPLICATIONS/INCORPORATION BY REFERENCE

This patent application makes reference to, claims priority to, and claims benefit from U.S. Provisional Application Ser. No. 61/305,174, which was filed on Feb. 17, 2010.

This application makes reference to:
U.S. Provisional Application Ser. No. 61/304,198 filed on Feb. 12, 2010;
U.S. patent application Ser. No. 12/732,940filed on Mar. 26, 2010;
U.S. Provisional Application Ser. No. 61/304,210 filed on Feb. 12, 2010; and
U.S. patent application Ser. No. 12/748,194filed on Mar. 26, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for determining a position fix indoors.

BACKGROUND OF THE INVENTION

Location-based services (LBS) are emerging as a new type of value-added service provided by mobile communication networks. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining a position fix indoors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining a position fix indoors. In various embodiments of the invention, whenever a mobile device is within proximity of a RF communication device in a building, the mobile device may be operable to receive location information transmitted from the RF communication device. In an embodiment of the invention, the location information may be broadcasted from the RF communication device. The transmitted location information may comprise altitude information of the RF communication device. At least an altitude of the mobile device may be determined based on the received location information. In one embodiment of the invention, the RF communication device may comprise, for example, a wireless LAN (WLAN) device that is located in an elevator car. The WLAN device in the elevator car may transmit the altitude information that is received from one or more sources comprising, for example, an elevator controller and/or a height determining device such as an altimeter. In another embodiment of the invention, the RF communication device may comprise, for example, a Bluetooth device that is located in an elevator car. The Bluetooth device in the elevator car may transmit the altitude information that is received from, for example, an elevator controller and/or a height determining device such as an altimeter. The RF communication device may also comprise a device that is located on a particular floor of the building. The RF communication device on a particular floor of the building may comprise, for example, a WLAN device, a Bluetooth device, a radio-frequency identification (RFID) tag and/or a near field communication (NFC) device.

The mobile device may be operable to determine a 3-dimentional (3D) location of the mobile device based on the altitude information and a latitude/longitude (LAT/LON) of the RF communication device that are transmitted by the RF communication device.

Figure 1:
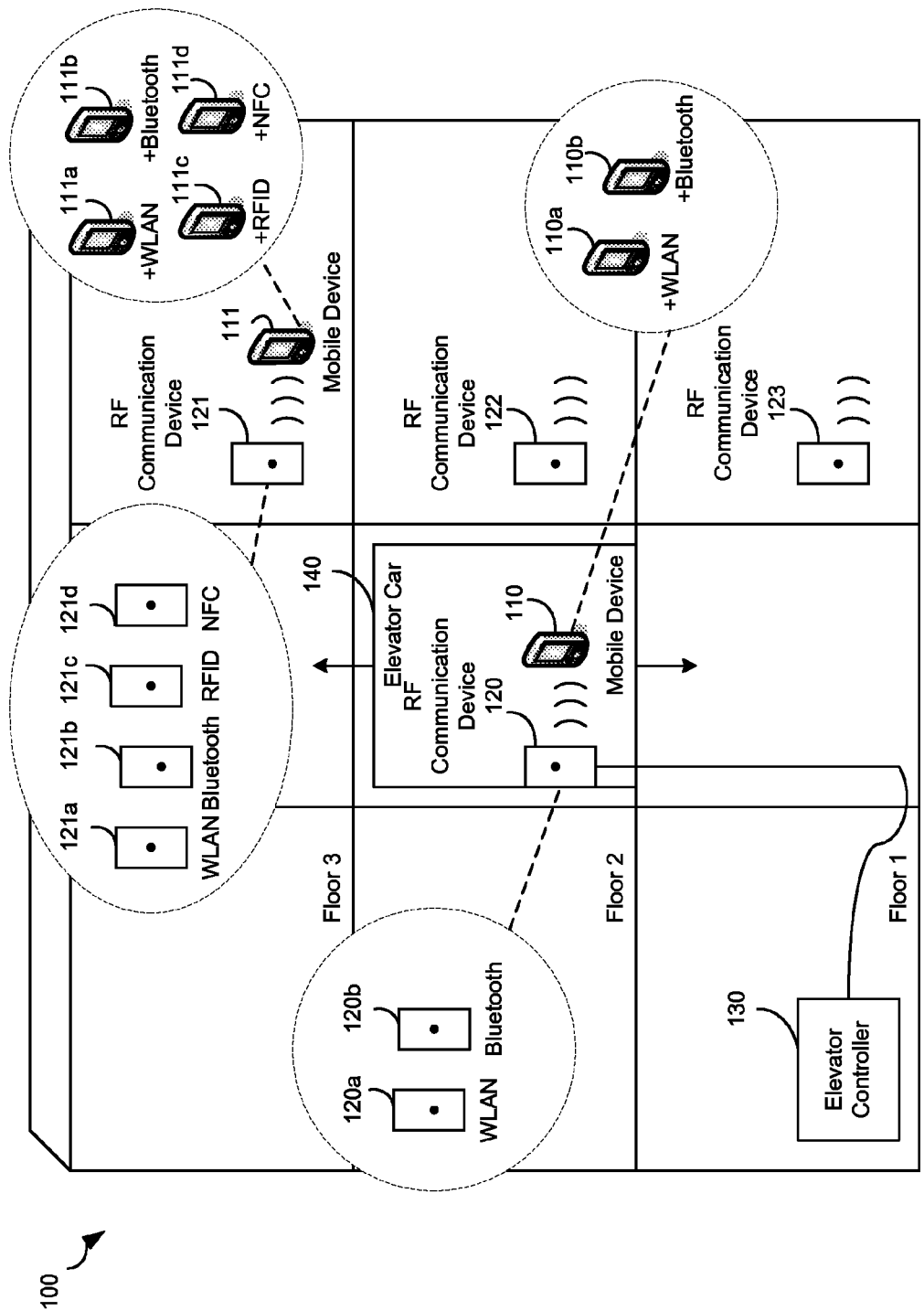
FIG. 1 is a block diagram illustrating an exemplary communication system that is operable to determine a position fix indoors, in accordance with an embodiment of the invention.

FIG. 1 is a block diagram illustrating an exemplary communication system that is operable to determine a position fix indoors, in accordance with an embodiment of the invention. Referring to FIG. 1, there is shown a communication system 100 in a building with three floors and an elevator car that moves amongst the three floors in the building. The communication system 100 comprises a plurality of mobile devices, of which mobile devices 110, 111 are illustrated, a plurality of RF communication device, of which RF communication devices 120-123 are illustrated and an elevator controller 130. In the exemplary embodiment of the invention illustrated in FIG. 1, three floors in a building and an elevator car 140 are shown. Notwithstanding, the invention is not so limited and the number of floors and/or the number of elevator cars may be different.

Each of the RF communication devices 120-123 such as the RF communication device 120 may comprise suitable logic, circuitry, interfaces and/or code that may be operable to communicate with a mobile device such as the mobile device 110 within short range using radio-frequency (RF) signals. A RF communication device such as the RF communication device 120 may be located in the elevator car 140. A RF communication device may also be located on a floor of the building. For example, the RF communication device 123 may be located on the floor 1 of a building, the RF communication device 122 may be located on the floor 2 of the building, and the RF communication device 121 may be located on the floor 3 of the building. Each of the RF communication devices 120-123 may transmit its altitude information such as, for example, floor number and/or actual height information associated with each of the RF communication devices 120-123. In an embodiment of the invention, each of the RF communication devices 120-123 may be operable to broadcast its altitude information such as, for example, floor number and/or actual height information associated with each of the RF communication devices 120-123. Alternatively, for example, the transmission of the altitude information may be included as part of a communication between the RF communication devices 120-123 and the mobile devices 110 and 111, made for another purpose, or may be made in response to a request by or via mobile devices 110 and 111. In this regard, for example, the altitude information transmitted by the RF communication device 121 may be acquired by the mobile devices 111 for determining an altitude or vertical location of the mobile device 111. In instances when a RF communication device is located in the elevator car 140 such as the RF communication device 120, the RF communication device 120 may receive the altitude information such as the floor number information from the elevator controller 130 each time when the elevator car 140 reach a floor of the building. The transmitted altitude information of the RF communication device 120 may be acquired by the mobile device 110 that communicates with the RF communication device 120 in the elevator car 140 for determining an altitude or vertical location of the mobile device 110.

In addition to transmitting the altitude information, each of the RF communication devices 120-123 may also, for example, transmit a latitude/longitude (LAT/LON) or location of the RF communication device 121. In this regard, for example, the altitude information and the LAT/LON transmitted by the RF communication device 121 may be acquired by the mobile devices 111 and utilized to determine a 3D location of the mobile device 111.

Each of the RF communication devices 120-123 may transmit the altitude information within a short range such as, for example, within a 3-meter range so that a transmitted signal on a floor may not interfere with other signals transmitted on adjacent floors. The range may be dependent on the amount of power that is utilized and/or the communication technology that is employed. A RF communication device installed on a particular floor of the building, such as the RF communication device 121 installed on the floor 3 of the building, may be located near an elevator car door so that the mobile device 111 may communicate with the RF communication device 121 to determine the altitude of the mobile device 111 before entering the elevator car 140 or after exiting the elevator car 140, for example.

In one exemplary embodiment of the invention, a RF communication device such as the RF communication device 120 that is located in the elevator car 140 or the RF communication device 121 that is located on the floor 3 may comprise, for example, a WLAN device 120a or 121a or a Bluetooth device 120b or 121b. The RF communication device 121 located on the floor 3 of the building may also comprise, for example, a RFID tag 121c or a NFC device 121d.

A WLAN device such as the WLAN device 120a may communicate with a WLAN enabled mobile device such as the WLAN enabled mobile device 110a using a WLAN technology such as Wi-Fi. The WLAN may be operated in an infrastructure mode or an ad-hoc mode. In the infrastructure mode, devices may communicate through a wireless access point (AP) that serves as a bridge to wired network infrastructure. The ad-hoc mode enables peer-to-peer (P2P) transmission between devices. In a P2P network, devices within range of each other may discover and communicate directly. In this regard, the WLAN device 120a and the WLAN enabled mobile device 110a may communicate peer to peer in a wireless ad-hoc network environment without a wireless AP. The WLAN device such as the WLAN device 120a may be operable to communicate altitude, and/or LAT and LON information with a WLAN enabled mobile device such as the WLAN enabled mobile device 110a A Bluetooth device such as the Bluetooth device 120b may communicate with a Bluetooth enabled mobile device such as the Bluetooth enabled mobile device 110b using Bluetooth. The Bluetooth provides a way to connect and exchange information over a short distance such as, for example, over a 1-meter distance between devices through a 2.4 GHz short-range RF bandwidth. In this regard, the Bluetooth device 120b and the Bluetooth enabled mobile device 110b may communicate with each other in a wireless personal area network (WPAN) environment. The Bluetooth device such as the Bluetooth device 120b may be operable to communicate altitude, and/or LAT and LON information with a Bluetooth enabled mobile device such as the Bluetooth enabled mobile device 110b.

A RFID tag such as the RFID tag 121c may communicate with a RFID enabled mobile device such as the RFID enabled mobile device 111c using RFID technology. A RFID tag affixed to or incorporated into a product, animal or person may be used for the purpose of identification and tracking within a proximate range such as, for example, within a 10-centimeter range using RF signals. In this regard, for example, the RFID tag 121c may be operable to communicate RFID information to the RFID enabled mobile device 111c which functions as a RFID reader, whenever the RFID enabled mobile device 111c is within, for example, 10 centimeters range of the RFID tag 121c. The RFID tag such as the RFID tag 121c may be operable to communicate altitude and/or LAT and LON information with a RFID enabled mobile device such as the RFID enabled mobile device 111c.

A NFC device such as the NFC device 121d may communicate with a NFC enabled mobile device such as the NFC enabled mobile device 111d. The use of NFC enables the exchange of data between devices over a proximate distance such as, for example, a 10-centimeter distance using RF signals. A NFC device such as the NFC device 121d may comprise a NFC tag and a NFC reader in a single device. In this regard, for example, the NFC device 121d may function as a NFC tag and the NFC enabled mobile device 111d may function as a NFC reader. The communication may occur whenever the NFC enabled mobile device 111d is within, for example, 10 centimeters range of the NFC device 121d. The NFC device such as the NFC device 121d may be operable to communicate altitude and/or LAT and LON information with a NFC enabled mobile device such as the NFC enabled mobile device 111d.

Each of the mobile devices 110, 111 such as the mobile device 110 may comprise suitable logic, circuitry, interfaces and/or code that may be operable to communicate radio signals across a wireless communication network using various wireless technologies such as, for example, WCDMA, UMTS, HSDPA, CDMA, EV-DO, GSM, GPRS, EDGE, EGPRS, LTE, WiMAX.

Whenever a mobile device such as the mobile device 111 is within short range or proximity of a RF communication device such as the RF communication device 121, the mobile device 111 may be operable to receive altitude information transmitted from the RF communication device 121. An altitude of the mobile device 111 may be determined based on the received altitude information such as floor number information of the RF communication device 121. The mobile device 111 may comprise, for example, a WLAN enabled mobile device 111a, a Bluetooth enabled mobile device 111b, a RFID enabled mobile device 111c and/or a NFC enabled mobile device 111d. The mobile device 110 in the elevator car 140 may comprise, for example, a WLAN enabled mobile device 110a and/or a Bluetooth enabled mobile device 110b.

In instances when a RF communication device such as the RF communication device 121 also transmits the LAT/LON of the RF communication 121, a mobile device such as the mobile device 111 may be operable to determine a 3D location of the mobile device 111 based on the altitude information and the transmitted LAT/LON of the RF communication device 121.

The elevator controller 130 may comprise suitable logic, circuitry, interfaces and/or code that may be operable to control and/or manage the operation of the elevator car 140. The elevator controller 130, which may comprise a programmable logic controller (PLC), which may be operable to provide altitude information such as, for example, the floor number information or actual height of the elevator car 140. For example, a floor number may be displayed inside the elevator car 140 whenever the elevator car 140 reaches a particular floor of a building. In this regard, the elevator controller 130 may be operable to communicate the altitude information to the RF communication device 120 which is located inside the elevator car 140. The altitude information provided by the elevator controller 130, or other source, may be transmitted by the RF communication device 120, for example.

In operation, a mobile device such as the mobile device 111 on the floor 3 may be operable to receive altitude information broadcasted from the RF communication device 121, whenever the mobile device 111 is within short range or proximity of the RF communication device 121. An altitude of the mobile device 111 may be determined based on the received altitude information of the RF communication device 121. A mobile device such as the mobile device 110 in the elevator car 140 may be operable to receive altitude information transmitted from the RF communication device 120 in the elevator car 140. An altitude of the mobile device 110 may be determined based on the received altitude information of the RF communication device 120 in the elevator car 140. The transmitted altitude information of the RF communication device 120, which is changed from floor to floor, may be received from the elevator controller 130.

The mobile device 110 or 111 may be operable to determine a 3D location of the mobile device 110 or 111 based on the altitude information and a LAT/LON of the RF communication device 120 or 121 that are transmitted by the RF communication device 120 or 121.

Figure 2:
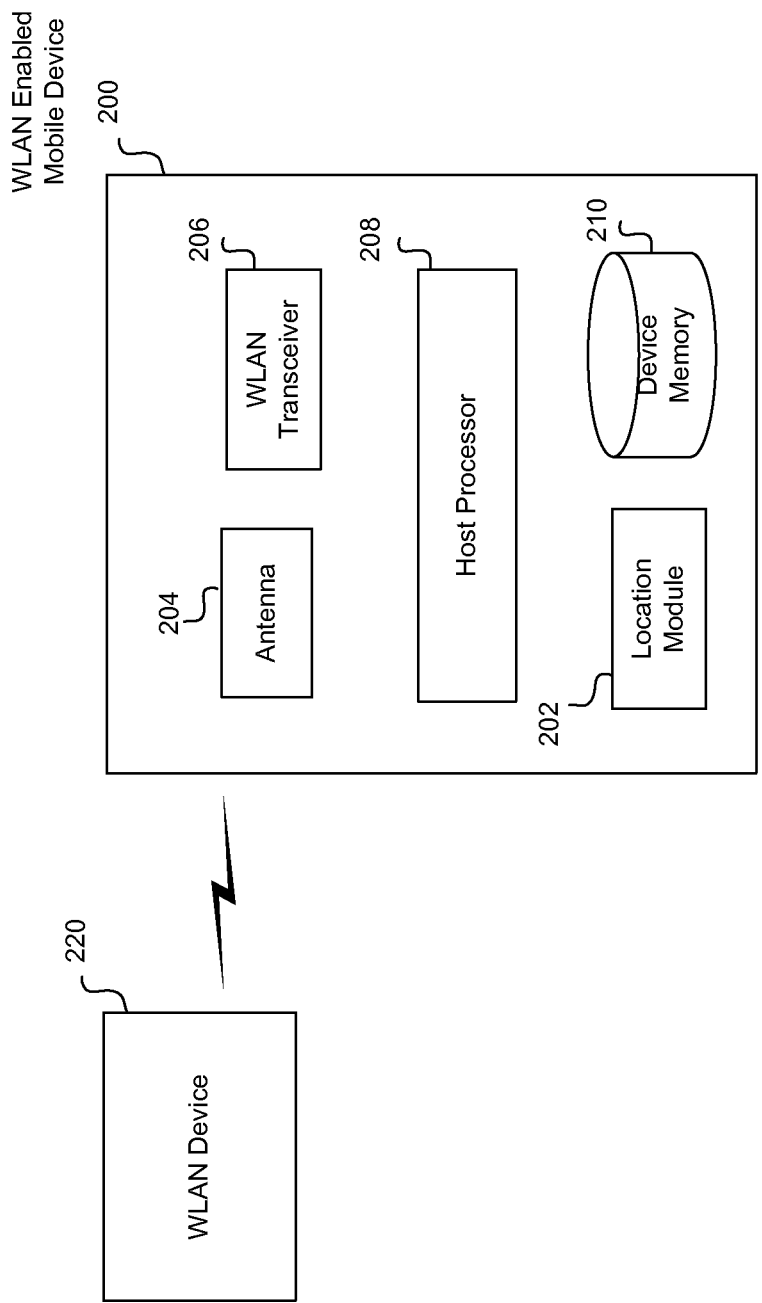
FIG. 2 is a block diagram illustrating an exemplary WLAN enabled mobile device that is operable to determine a position fix indoors, in accordance with an embodiment of the invention.

FIG. 2 is a block diagram illustrating an exemplary WLAN enabled mobile device that is operable to determine a position fix indoors, in accordance with an embodiment of the invention. Referring to FIG. 2, there is shown a WLAN enabled mobile device 200 and a WLAN device 220. The WLAN enabled mobile device 200 may comprise a location module 202, an antenna 204, a WLAN transceiver 206, a host processor 208 and a device memory 210.

The location module 202 may comprise suitable logic, circuitry, interfaces and/or code that may be operable to determine a location of the WLAN enabled mobile device 200. In an exemplary embodiment of the invention, the location module 202 may be operable to receive altitude information transmitted from the WLAN device 220 via the WLAN transceiver 206, whenever the WLAN transceiver 206 is within short range or proximity of the WLAN device 220. An altitude of the WLAN enabled mobile device 200 may be determined based on the received altitude information of the WLAN device 220.

The location module 202 may also be operable to determine a 3D location of the WLAN enabled mobile device 200 based on the altitude information and a LAT/LON of the WLAN device 220 that are communicated from the WLAN device 220 via the WLAN transceiver 206, whenever the WLAN transceiver 206 is within short range of the WLAN device 220.

The antenna 204 may comprise suitable logic, circuitry, interfaces and/or code that may be operable to communicate radio signals over a wireless communication network using various wireless access technologies such as, for example, WCDMA, UMTS, HSDPA, CDMA, EV-DO, GSM, GPRS, EDGE, EGPRS, LTE, WiMAX.

The WLAN transceiver 206 may comprise suitable logic, circuitry, interfaces and/or code that may be operable to receive/transmit RF signals using a WLAN technology. The WLAN transceiver 206 may be operable to communicate with the WLAN device 220 peer to peer without a wireless AP.

The host processor 208 may comprise suitable logic, circuitry, interfaces and/or code that may be operable to process signals from the antenna 204, the WLAN transceiver and/or the location module 202. The host processor 208 may manage and/or control operations of the antenna 204, the WLAN transceiver 206 and/or the location module 202. The host processor 208 may be operable to communicate signals with a wireless communication network via the antenna 204. The host processor 208 may also be operable to receive A-GNSS data over the antenna 204 and/or the WLAN transceiver 206.

The device memory 210 may comprise suitable logic, circuitry, interfaces and/or code that may be operable to store information such as executable instructions, data and/or database that may be utilized by the host processor 208 and the location module 202. The device memory 210 may comprise RAM, ROM, low latency nonvolatile memory such as flash memory and/or other suitable electronic data storage.

The WLAN device 220 may comprise suitable logic, circuitry, interfaces and/or code that may be operable to communicate with a device such as the WLAN enabled mobile device 200 via the WLAN transceiver 206 using a WLAN technology. In an exemplary embodiment of the invention, the WLAN device 220 may be operable to transmit its altitude information such as, for example, floor number information. In instances when the WLAN device 220 is located in the elevator car 140, the WLAN device 220 may receive the altitude information from the elevator controller 130. The WLAN device 220 may also be operable to transmit, for example, its LAT/LON.

In operation, the location module 202 may be operable to receive altitude information transmitted from the WLAN device 220 via the WLAN transceiver 206, whenever the WLAN transceiver 206 is within short range of the WLAN device 220. An altitude of the WLAN enabled mobile device 200 may be determined based on the received altitude information of the WLAN device 220.

The location module 202 may also be operable to determine a 3D location of the WLAN enabled mobile device 200 based on the altitude information and a LAT/LON of the WLAN device 220 that are communicated from the WLAN device 220 via the WLAN transceiver 206, whenever the WLAN transceiver 206 is within short range of the WLAN device 220.

Figure 3:
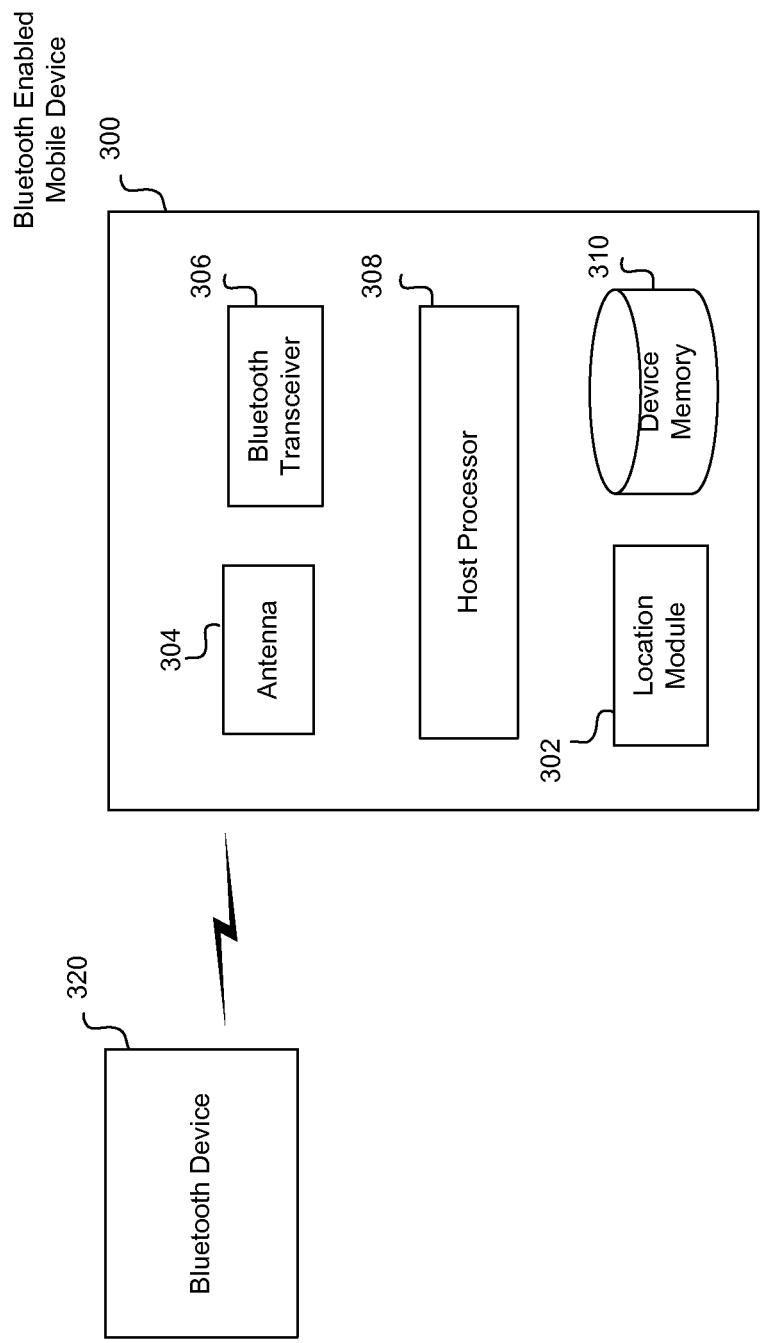
FIG. 3 is a block diagram illustrating an exemplary Bluetooth enabled mobile device that is operable to determine a position fix indoors, in accordance with an embodiment of the invention.

FIG. 3 is a block diagram illustrating an exemplary Bluetooth enabled mobile device that is operable to determine a position fix indoors, in accordance with an embodiment of the invention. Referring to FIG. 3, there is shown a Bluetooth enabled mobile device 300 and a Bluetooth device 320. The Bluetooth enabled mobile device 300 may comprise a location module 302, an antenna 304, a Bluetooth transceiver 306, a host processor 308 and a device memory 310.

The location module 302 may comprise suitable logic, circuitry, interfaces and/or code that may be operable to determine a location of the Bluetooth enabled mobile device 300. In an exemplary embodiment of the invention, the location module 302 may be operable to receive altitude information transmitted from the Bluetooth device 320 via the Bluetooth transceiver 306, whenever the Bluetooth transceiver 306 is within short range such as, for example, within 1-meter range of the Bluetooth device 320. An altitude of the Bluetooth enabled mobile device 300 may be determined based on the received altitude information of the Bluetooth device 320.

The location module 302 may also be operable to determine a 3D location of the Bluetooth enabled mobile device 300 based on the altitude information and a LAT/LON of the Bluetooth device 320 that are communicated from the Bluetooth device 320 via the Bluetooth transceiver 306, whenever the Bluetooth transceiver 306 is within short range such as, for example, within 1-meter range of the Bluetooth device 320.

The antenna 304 may comprise suitable logic, circuitry, interfaces and/or code that may be operable to communicate radio signals over a wireless communication network using various wireless access technologies such as, for example, WCDMA, UMTS, HSDPA, CDMA, EV-DO, GSM, GPRS, EDGE, EGPRS, LTE, WiMAX.

The Bluetooth transceiver 306 may comprise suitable logic, circuitry, interfaces and/or code that may be operable to receive/transmit RF signals using Bluetooth technology. The Bluetooth transceiver 306 may be operable to communicate with the Bluetooth device 320 within short range such as, for example, within 1-meter range of the Bluetooth device 320.

The host processor 308 may comprise suitable logic, circuitry, interfaces and/or code that may be operable to process signals from the antenna 304, the Bluetooth transceiver 306 and/or the location module 302. The host processor 308 may manage and/or control operations of the antenna 304, the Bluetooth transceiver 306 and/or the location module 302. The host processor 308 may be operable to communicate signals with a wireless communication network via the antenna 304. The host processor 308 may also be operable to receive A-GNSS data over the antenna 304 and/or the Bluetooth transceiver 306.

The device memory 310 may comprise suitable logic, circuitry, interfaces and/or code that may be operable to store information such as executable instructions, data and/or database that may be utilized by the host processor 308 and the location module 302. The device memory 310 may comprise RAM, ROM, low latency nonvolatile memory such as flash memory and/or other suitable electronic data storage.

The Bluetooth device 320 may comprise suitable logic, circuitry, interfaces and/or code that may be operable to communicate with a device such as the Bluetooth enabled mobile device 300 via the Bluetooth transceiver 306 using Bluetooth technology. In an exemplary embodiment of the invention, the Bluetooth device 320 may be operable to transmit its altitude information such as, for example, floor number information. In instances when the Bluetooth device 320 is located in the elevator car 140, the Bluetooth device 320 may received the altitude information from the elevator controller 130. The Bluetooth device 320 may also be operable to transmit its LAT/LON.

In operation, the location module 302 may be operable to receive altitude information transmitted from the Bluetooth device 320 via the Bluetooth transceiver 306, whenever the Bluetooth transceiver 306 is within short range such as, for example, within 1-meter range of the Bluetooth device 320. An altitude of the Bluetooth enabled mobile device 300 may be determined based on the received altitude information of the Bluetooth device 320.

The location module 302 may also be operable to determine a 3D location of the Bluetooth enabled mobile device 300 based on the altitude information and a LAT/LON of the Bluetooth device 320 that are communicated from the Bluetooth device 320 via the Bluetooth transceiver 306, whenever the Bluetooth transceiver 306 is within short range such as within 1-meter range of the Bluetooth device 320.

Figure 4:
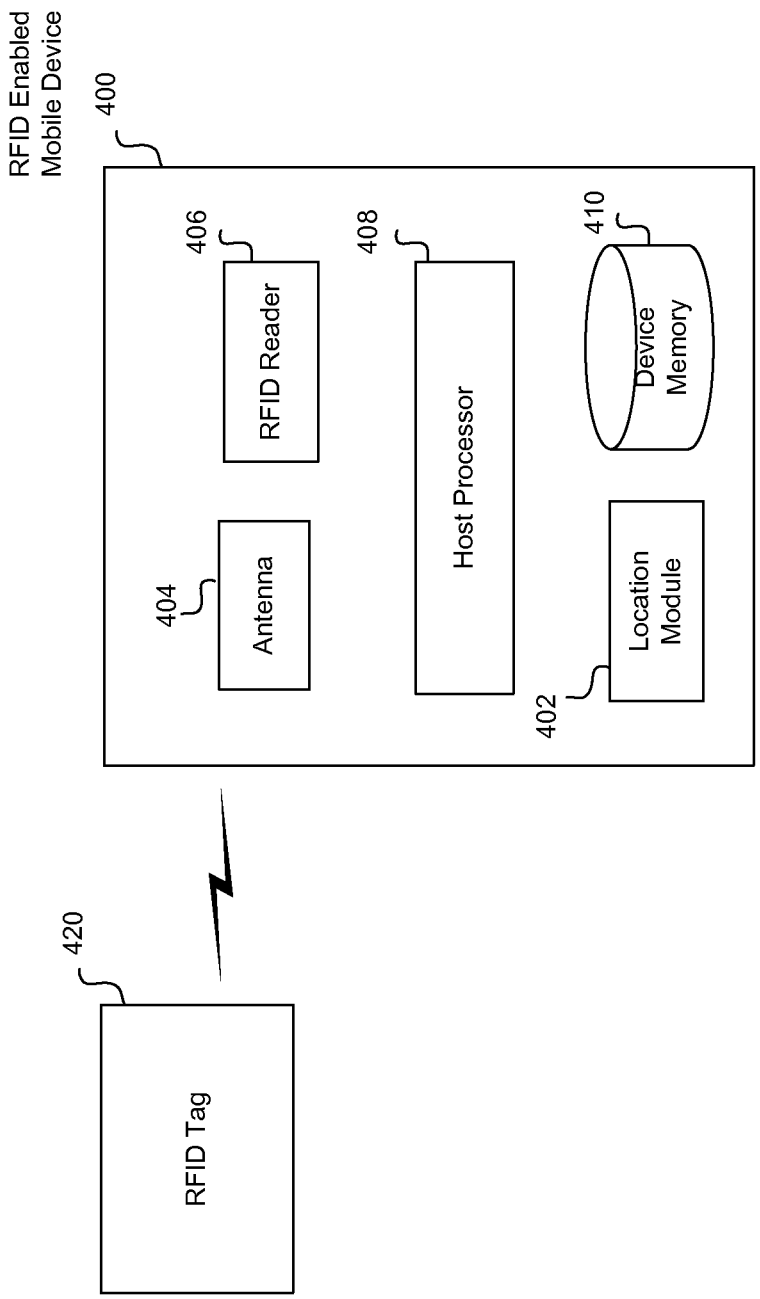
FIG. 4 is a block diagram illustrating an exemplary RFID enabled mobile device that is operable to determine a position fix indoors, in accordance with an embodiment of the invention.

FIG. 4 is a block diagram illustrating an exemplary RFID enabled mobile device that is operable to determine a position fix indoors, in accordance with an embodiment of the invention. Referring to FIG. 4, there is shown a RFID enabled mobile device 400 and a RFID tag 420. The RFID enabled mobile device 400 may comprise a location module 402, an antenna 404, a RFID reader 406, a host processor 408 and a device memory 410.

The location module 402 may comprise suitable logic, circuitry, interfaces and/or code that may be operable to determine a location of the RFID enabled mobile device 400. In an exemplary embodiment of the invention, the location module 402 may be operable to receive altitude information transmitted from the RFID tag 420 via the RFID reader 406, whenever the RFID reader 406 is within proximate range such as, for example, within 10-centimeter range of the RFID tag 420. An altitude of the RFID enabled mobile device 400 may be determined based on the received altitude information of the RFID tag 420.

The location module 402 may also be operable to determine a 3D location of the RFID enabled mobile device 400 based on the altitude information and a LAT/LON of the RFID tag 420 that are communicated from the RFID tag 420 via the RFID reader 406, whenever the RFID reader 406 is within proximate range such as, for example, within 10-centimeter range of the RFID tag 420.

The antenna 404 may comprise suitable logic, circuitry, interfaces and/or code that may be operable to communicate radio signals over a wireless communication network using various wireless access technologies such as, for example, WCDMA, UMTS, HSDPA, CDMA, EV-DO, GSM, GPRS, EDGE, EGPRS, LTE, WiMAX.

The RFID reader 406 may comprise suitable logic, circuitry, interfaces and/or code that may be operable to communicate with a RFID tag such as the RFID tag 420 using RFID technology. The RFID reader 406 may be operable to communicate with the RFID tag 420 within proximate range such as, for example, within 10-centimeter range of the RFID tag 420.

The host processor 408 may comprise suitable logic, circuitry, interfaces and/or code that may be operable to process signals from the antenna 404, the RFID reader 406 and/or the location module 402. The host processor 408 may manage and/or control operations of the antenna 404, the RFID reader 406 and/or the location module 402. The host processor 408 may be operable to communicate signals with a wireless communication network via the antenna 404. The host processor 408 may also be operable to receive A-GNSS data over the antenna 404.

The device memory 410 may comprise suitable logic, circuitry, interfaces and/or code that may be operable to store information such as executable instructions, data and/or database that may be utilized by the host processor 408 and the location module 402. The device memory 410 may comprise RAM, ROM, low latency nonvolatile memory such as flash memory and/or other suitable electronic data storage.

The RFID tag 420 may comprise suitable logic, circuitry, interfaces and/or code that may be operable to communicate with a device such as the RFID enabled mobile device 400 via the RFID reader 406 using RFID technology. In an exemplary embodiment of the invention, the RFID tag 420 may be operable to transmit its altitude information such as, for example, floor number information. The RFID tag 420 may also be operable to transmit, for example, its LAT/LON.

In operation, the location module 402 may be operable to receive altitude information transmitted from the RFID tag 420 via the RFID reader 406, whenever the RFID reader 406 is within proximate range such as, for example, within 10-centimeter range of the RFID tag 420. An altitude of the RFID enabled mobile device 400 may be determined based on the received altitude information of the RFID tag 420.

The location module 402 may also be operable to determine a 3D location of the RFID enabled mobile device 400 based on the altitude information and a LAT/LON of the RFID tag 420 that are communicated from the RFID tag 420 via the RFID reader 406, whenever the RFID reader 406 is within proximate range such as within 10-centimeter range of the RFID tag 420.

Figure 5:
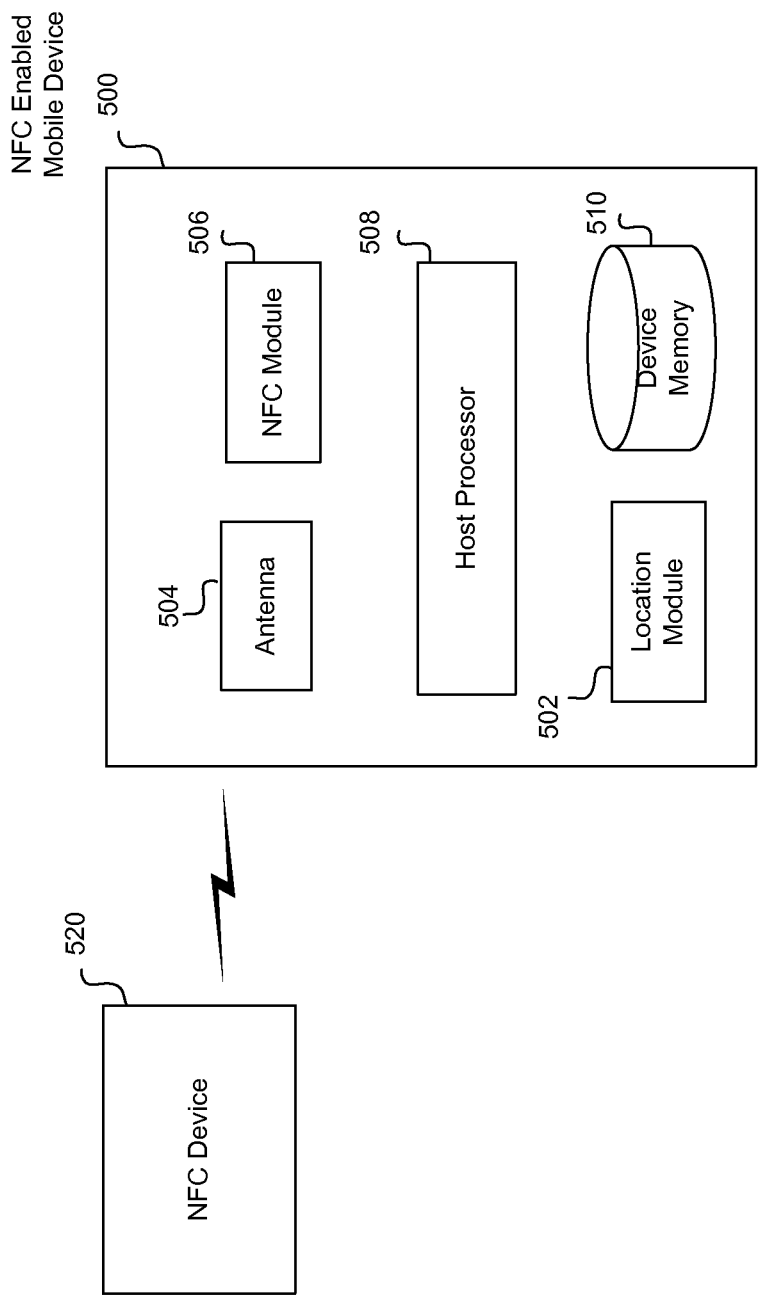
FIG. 5 is a block diagram illustrating an exemplary NFC enabled mobile device that is operable to determine a position fix indoors, in accordance with an embodiment of the invention.

FIG. 5 is a block diagram illustrating an exemplary NFC enabled mobile device that is operable to determine a position fix indoors, in accordance with an embodiment of the invention. Referring to FIG. 5, there is shown a NFC enabled mobile device 500 and a NFC device 520. The NFC enabled mobile device 500 may comprise a location module 502, an antenna 504, a NFC module 506, a host processor 508 and a device memory 510.

The location module 502 may comprise suitable logic, circuitry, interfaces and/or code that may be operable to determine a location of the NFC enabled mobile device 500. In an exemplary embodiment of the invention, the location module 502 may be operable to receive altitude information transmitted from the NFC device 520 via the NFC module 506, whenever the NFC module 506 is within proximate range such as, for example, within 10-centimeter range of the NFC device 520. An altitude of the NFC enabled mobile device 500 may be determined based on the received altitude information of the NFC device 520.

The location module 502 may also be operable to determine a 3D location of the NFC enabled mobile device 500 based on the altitude information and a LAT/LON of the NFC device 520 that are communicated from the NFC device 520 via the NFC module 506, whenever the NFC module 506 is within proximate range such as, for example, within 10-centimeter range of the NFC device 520.

The antenna 504 may comprise suitable logic, circuitry, interfaces and/or code that may be operable to communicate radio signals over a wireless communication network using various wireless access technologies such as, for example, WCDMA, UMTS, HSDPA, CDMA, EV-DO, GSM, GPRS, EDGE, EGPRS, LTE, WiMAX.

The NFC module 506 may comprise suitable logic, circuitry, interfaces and/or code that may be operable to communicate with a NFC device such as the NFC device 520 using NFC technology. The NFC module 506 may be operable to communicate with the NFC device 520 within proximate range such as, for example, within 10-centimeter range of the NFC device 520.

The host processor 508 may comprise suitable logic, circuitry, interfaces and/or code that may be operable to process signals from the antenna 504, the NFC module 506 and/or the location module 502. The host processor 308 may manage and/or control operations of the antenna 504, the NFC module 506 and/or the location module 502. The host processor 508 may be operable to communicate signals with a wireless communication network via the antenna 504. The host processor 508 may also be operable to receive A-GNSS data over the antenna 504.

The device memory 510 may comprise suitable logic, circuitry, interfaces and/or code that may be operable to store information such as executable instructions, data and/or database that may be utilized by the host processor 508 and the location module 502. The device memory 510 may comprise RAM, ROM, low latency nonvolatile memory such as flash memory and/or other suitable electronic data storage.

The NFC device 520 may comprise suitable logic, circuitry, interfaces and/or code that may be operable to communicate with a device such as the NFC enabled mobile device 500 via the NFC module 506 using NFC technology. In an exemplary embodiment of the invention, the NFC device 520 may be operable to transmit its altitude information such as, for example, floor number information. The NFC device 520 may also be operable to transmit, for example, its LAT/LON.

In operation, the location module 502 may be operable to receive altitude information transmitted from the NFC device 520 via the NFC module 506, whenever the NFC module 506 is within proximate range such as, for example, within 10-centimeter range of the NFC device 520. An altitude of the NFC enabled mobile device 500 may be determined based on the received altitude information of the NFC device 520.

The location module 502 may also be operable to determine a 3D location of the NFC enabled mobile device 500 based on the altitude information and a LAT/LON of the NFC device 520 that are communicated from the NFC device 520 via the NFC module 506, whenever the NFC module 506 is within proximate range such as within 10-centimeter range of the NFC device 520.

Figure 6:
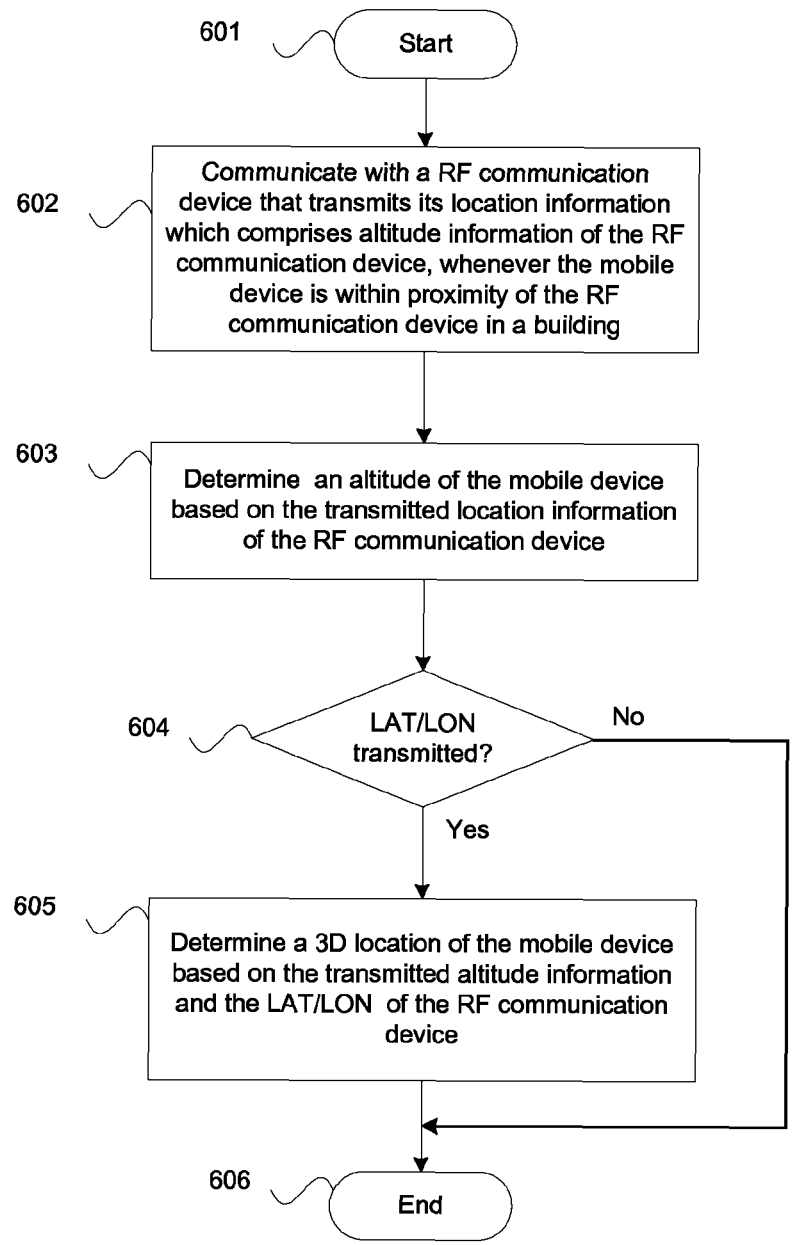
FIG. 6 is a flow chart illustrating exemplary steps for determining a position fix indoors, in accordance with an embodiment of the invention.

FIG. 6 is a flow chart illustrating exemplary steps for determining a position fix indoors, in accordance with an embodiment of the invention. Referring to FIG. 6, the exemplary steps start at step 601. In step 602, the mobile device 111 may be operable to communicate with a RF communication device 121 that transmits its location information which comprises altitude information of the RF communication device 121, whenever the mobile device 111 is within proximity of the RF communication device 121 in a building. In step 603, the mobile device 111 may be operable to determine an altitude of the mobile device 111 based on the transmitted location information of the RF communication device 121. In step 604, a LAT/LON that is transmitted by the RF communication device 121 is checked. In instances when a LAT/LON is also transmitted by the RF communication device 121, the exemplary steps may proceed to step 605. In step 605, the mobile device 111 may be operable to determine a 30location of the mobile device 111 based on the transmitted altitude information and the LAT/LON of the RF communication device 121. The exemplary steps may proceed to the end step 606. In step 604, in instances when a LAT/LON is not transmitted by the RF communication device 121, the exemplary steps may proceed to the end step 606.

In various embodiments of the invention, whenever a mobile device 110 or 111 is within proximity of a RF communication device 120 or 121 in a building, the mobile device 110 or 111 may be operable to receive location information transmitted from the RF communication device 120 or 121. In an embodiment of the invention, the location information may be broadcasted from the RF communication device 120 or 121. Alternatively, for example, the transmission of the location information may be included as part of a communication between the RF communication device 120 or 121 and the mobile device 110 or 111, made for another purpose, or may be made in response to a request by or via the mobile device 110 or 111. The transmitted location information may comprise altitude information of the RF communication device 120 or 121. At least an altitude of the mobile device 110 or 111 may be determined based on the received location information. In one embodiment of the invention, the RF communication device 120 may comprise, for example, a WLAN device 120a that is located in an elevator car 140, which moves between floors of the building. The WLAN device 120a in the elevator car 140 may transmit the altitude information that is received from one or more sources comprising, for example, an elevator controller 130 and/or an altimeter device. The altimeter device may be integrated into or be coupled by wires and/or wirelessly to, for example, the WLAN device 120a. In another embodiment of the invention, the RF communication device 120 may comprise, for example, a Bluetooth device 120b that is located in an elevator car 140. The Bluetooth device 120b in the elevator car 140 may transmit the altitude information that is received from, for example, an elevator controller 130 and/or an altimeter device. The RF communication device 121 located on a particular floor of the building may comprise, for example, a WLAN device 121a, a Bluetooth device 121b, a RFID tag 121c and/or a NFC device 121d.

The mobile device 110 or 111 may be operable to determine a 3D location of the mobile device 110 or 111 based on the altitude information and a latitude/longitude (LAT/LON) of the RF communication device 120 or 121 that are transmitted by the RF communication device 120 or 121.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining a position fix indoors.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a building, the method comprising:
communicating, by a mobile device, with a radio frequency (RF) communication device in said building for a purpose other than for requesting location information;
receiving location information, at said mobile device as part of a communication from said RF communication device,
wherein said location information is transmitted wirelessly from said RF communication device while said mobile device is moving and while said RF communication device is stationary, when said mobile device is within proximity of said RF communication device;
obtaining, by said mobile device, altitude information and a latitude and longitude (LAT/LON) of said RF communication device from said location information; and
calculating, by said mobile device, a 3-dimensional (3D) location of said mobile device based on said altitude information and said LAT/LON for use in a location based service.

2. The method according to claim 1, wherein said RF communication device comprises a wireless local area network (WLAN) device that is located in an elevator car.

3. The method according to claim 2, further comprising:
   transmitting, by said WLAN device, said altitude information that is received from an elevator controller.
4. The method according to claim 1, wherein said RF communication device comprises a Bluetooth device that is located in an elevator car.
5. The method according to claim 4, further comprising:
   transmitting, by said Bluetooth device, said altitude information that is received from an elevator controller.
6. The method according to claim 1, wherein said RF communication device is located on a particular floor of said building.
7. The method according to claim 6, wherein said RF communication device comprises at least one of:
   a Bluetooth device;
   a radio-frequency identification (RFID) tag; and
   a near field communication (NFC) device.
8. The method according to claim 1, wherein receiving comprises:
   broadcasting said location information from said RF communication device.
9. A mobile device, comprising:
   a transceiver configured to communicate with a radio frequency (RF) communication device in a building for a purpose other than for requesting location information and to receive, as part of a communication from said RF communication device, location information transmitted wirelessly from said RF communication device while said mobile device is moving and while said RF communication device is stationary, when said mobile device is within proximity of said RF communication device;
   a location module configured to obtain altitude information and a latitude and longitude (LAT/LON) of said RF communication device and to calculate a 3-dimensional (3D) location of said mobile device based on said obtained altitude information and LAT/LON for use in a location based service; and
   a processor configured to control operation of said transceiver and said location module.
10. A mobile device, comprising:
    a transceiver configured to communicate with a wireless local area network (WLAN) device located in an elevator car in a building for a purpose other than for requesting location information and to receive, as part of a communication from said WLAN device, location information transmitted wirelessly from said WLAN device while said mobile device is moving and while said WLAN device is stationary with respect to said elevator car, when said mobile device is within proximity of said WLAN device;
    wherein said transmitted location information comprises altitude information of said WLAN device;
    a location module configured to calculate an altitude of said mobile device based on said received location information for use in a location based service; and
    a processor configured to control operation of said transceiver and said location module.
11. The mobile device according to claim 10, wherein said WLAN device is configured to transmit said altitude information that is received from an elevator controller.
12. The mobile device according to claim 9, wherein said RF communication device comprises a Bluetooth device that is located in an elevator car.
13. The mobile device according to claim 12, wherein said Bluetooth device is configured to transmit said altitude information that is received from an elevator controller.
14. The mobile device according to claim 9, wherein said RF communication device is located on a particular floor of said building.
15. The mobile device according to claim 9, wherein said RF communication device comprises a Bluetooth device that is located on a particular floor of said building.
16. The mobile device according to claim 9, wherein said RF communication device comprises a radio-frequency identification (RFID) tag that is located on a particular floor of said building.
17. The mobile device according to claim 9, wherein said RF communication device comprises a near field communication (NFC) device that is located on a particular floor of said building.
18. The mobile device according to claim 9, wherein said RF communication device is configured to broadcast said location information.
19. The method of claim 1, further comprising:
    requesting, by said mobile device, said location information from said RF communication device before receiving said location information.
20. The method of claim 1, wherein said location based service comprises an enhanced 911 service, the method further comprising:
    using said calculated 3D location of said mobile device in said enhanced 911 service.
21. The method of claim 1, wherein said location information is pre-set in said RF communication device or received at said RF communication device from an altimeter.

* * * * *